(12) United States Patent
Tsubokura et al.

(10) Patent No.: US 7,944,518 B2
(45) Date of Patent: May 17, 2011

(54) LIQUID CRYSTAL DISPLAY DEVICE

(75) Inventors: Masaki Tsubokura, Mobara (JP); Shimon Itakura, Mobara (JP)

(73) Assignees: Hitachi Displays, Ltd., Chiba (JP); IPS Alpha Technology, Ltd., Chiba (JP)

( * ) Notice: Subject to any disclaimer, the term of this patent is extended or adjusted under 35 U.S.C. 154(b) by 132 days.

(21) Appl. No.: 12/200,948

(22) Filed: Aug. 29, 2008

(65) Prior Publication Data

US 2009/0059113 A1 Mar. 5, 2009

(30) Foreign Application Priority Data

Aug. 31, 2007 (JP) ................................. 2007-226407

(51) Int. Cl.
*G02F 1/1337* (2006.01)
(52) U.S. Cl. .......................................... 349/58; 349/70
(58) Field of Classification Search ..................... 349/70, 349/58
See application file for complete search history.

(56) References Cited

U.S. PATENT DOCUMENTS

| | | | |
|---|---|---|---|
| 7,189,424 B2 * | 3/2007 | Gorski | 426/560 |
| 7,585,100 B2 * | 9/2009 | Aoki et al. | 362/634 |
| 2005/0265047 A1 | 12/2005 | Yun et al. | |

FOREIGN PATENT DOCUMENTS

JP 2005-347259 12/2005

* cited by examiner

*Primary Examiner* — David Nelms
*Assistant Examiner* — Phu Vu
(74) *Attorney, Agent, or Firm* — Antonelli, Terry, Stout & Kraus, LLP.

(57) ABSTRACT

A liquid crystal display device includes a liquid crystal display panel, a backlight and a power supply controlling circuit substrate. The backlight has a rectangular shaped frame member with long and short sides, light sources in rod form within the frame member, and first and second electrode supporting members electrically connected to opposite ends of the light sources. A wire guide member is arranged along one long side of the frame member and holds a wire for electrically connecting at least one of the first and second electrode supporting members to the power supply controlling circuit substrate. The wire guide member has a wire securing portion where the wire is secured and a temporary wire securing portion which at least temporarily secures the wire running between the wire securing portion and the power supply controlling circuit substrate.

15 Claims, 8 Drawing Sheets

Fig.9 ured lower frame and the above described power supply controlling circuit substrate, and these connectors can be electrically coupled with the connectors mounted on the above described power supply controlling circuit substrate.

LIQUID CRYSTAL DISPLAY DEVICE

The present application claims priority from Japanese Application JP2007-226407 filed on Aug. 31, 2007, the content of which is hereby incorporated by reference into this application.

BACKGROUND OF THE INVENTION (1) Field of the Invention

The present invention relates to a liquid crystal display device, and in particular, to a liquid crystal display device having a backlight directly behind the display.

(2) Related Art Statement

As liquid crystal display panels tend to become larger, liquid crystal display devices having a backlight directly behind the display where the surface light source for the backlight can be made uniform are used.

In such backlights, a number of fluorescent tubes are aligned in a direction perpendicular to the longitudinal direction within a plane of the lower frame (base) having a light reflecting function which faces the liquid crystal display panel. Each of these fluorescent tubes is sandwiched by electrode metal fixtures in electrode portions at the two ends, and the electrode metal fixtures are placed at the two ends of the above described base.

Thus, a number of electrode metal fixtures are formed on electrode supporting members in band form made of a conductive material which extend in the direction in which the above described fluorescent tubes are aligned. That is to say, the electrode supporting members have a function of sandwiching and holding a number of fluorescent tubes.

Therefore, the numbers of fluorescent tubes within the backlight area are connected in parallel by the electrode supporting members and the electrode metal fixtures at the two ends of the base.

In addition, a power supply controlling circuit substrate with an inverter for turning on and controlling the fluorescent tubes is mounted on the rear surface of the above described base in such a manner that one power supplying terminal of the power supply controlling circuit substrate is connected to the electrode supporting member on one end side via a wire (cable) and the other power supplying terminal is connected to the electrode supporting member on the other end side via a wire (cable), and as a result, power is supplied to the respective external electrode fluorescent tubes described above.

A liquid crystal display device having a backlight using external electrode fluorescent tubes as those described above is disclosed in the following Patent Document 1, for example.

(Patent Document 1) Japanese Unexamined Patent Publication 2005-347259 (Corresponding U.S. Application US2005/0265047 A1)

SUMMARY OF THE INVENTION

Problem to be Solved by the Invention

In liquid crystal display devices having the above described configuration, wires for the connection to the above described power supply controlling circuit substrate which are respectively connected to the above described electrode supporting members are formed so as to have a connector in the end portion on the side where connected to the above described power supply controlling circuit substrate, and these connectors can be electrically coupled with the connectors mounted on the above described power supply controlling circuit substrate.

The area of the power supply controlling circuit substrate is small relative to the lower frame, and therefore, the power supply controlling substrate is usually located on the rear surface of one of the above described electrode supporting members.

Therefore, in some cases one of the wires connected to the above described electrode supporting members must be longer than the other, and in such cases, trenches or hooks are created in the above described lower frame, and a measure for securing the longer wire to the lower frame is taken for wiring.

In order to make assembly easier, however, the wires must be in such a state as to allow for the free movement of parts between the location where the wires are secured to the lower frame and the above described power supply controlling circuit substrate. Therefore, the part of the wires over the location where the wires are secured to the lower frame cannot be helped from moving freely until the connection to the power supply controlling circuit substrate is completed.

This leads to a disadvantage, such that part of the wires over the location where the wires are secured to the lower frame frequently fluctuates and repeatedly interferes with the lower frame, making it easy for the wires to become disconnected and the connector to be damaged when the lower frame is carried at a stage before the above described power supply controlling substrate is attached to the above described base made of a lower frame and the like.

An object of the present invention is to provide a liquid crystal display device having a backlight where a light source and a power supply controlling circuit substrate for controlling the light source are connected through wires and assembly is easier.

Means for Solving Problem

The gist of typical inventions from among the inventions disclosed in the present specification is briefly described below.

A liquid crystal display device is provided with a liquid crystal display panel, a backlight provided on one surface side of the above described liquid crystal display panel and a power supply controlling circuit substrate for turning on and controlling the above described backlight which is mounted on the surface of the above described backlight on the side opposite to the surface which faces the above described liquid crystal display panel, and characterized in that the above described backlight has a frame member, a number of light sources in rod form aligned in parallel within the frame member, a first electrode supporting member electrically connected to one end of the above described number of light sources in rod form, and a second electrode supporting member electrically connected to the other end of the above described number of light sources in rod form, a portion of the above described frame member is provided with a wire guide member where a wire for electrically connecting at least one of the above described first electrode supporting member and second electrode supporting member to the above described power supply controlling circuit substrate is provided, and the above described wire guide member is provided with a wire securing portion where the above described wire is secured and a temporary wire securing portion to which the above described wire running between the wire portion and the above described power supply controlling circuit substrate is secured.

Furthermore, a liquid crystal display device is provided with a liquid crystal display panel, a backlight provided on one surface side of the above described liquid crystal display panel and a power supply controlling circuit substrate for turning on and controlling the above described backlight which is mounted on the surface of the above described backlight on the side opposite to the surface which faces the above described liquid crystal display panel, and characterized in that the above described backlight has a frame member, a number of light sources in rod form aligned in parallel within the frame member, a first electrode supporting member electrically connected to one end of the above described number of light sources in rod form, and a second electrode supporting member electrically connected to the other end of the above described number of light sources in rod form, a portion of the above described frame member is provided with a wire guide member where a wire for electrically connecting at least one of the above described first electrode supporting member and second electrode supporting member to the above described power supply controlling circuit substrate is provided, a first connector is formed in the end portion of the above described wire which is connected to the above described power supply controlling circuit substrate, and the above described wire guide member is provided with a wire securing portion where the above described wire is secured and a temporary connector securing portion into which the above described first connector can be inserted.

Here, the present invention is not limited to the above described configuration, and various modifications are possible within such a scope as not to deviate from the technical idea of the present invention.

Effects of the Invention

In the thus formed liquid crystal display device, the wire running out from the light source which is connected to the power supply controlling substrate via a connector can be secured even when the wire is in such a state as not to be coupled with the above described power supply controlling circuit substrate, and therefore, the connector can be prevented from interfering with the lower frame.

BRIEF DESCRIPTION OF THE DRAWINGS

FIGS. 3(a) and 3(b) are plan diagrams showing a backlight provided with the liquid crystal display device according to the present invention.

EXPLANATION OF NUMERALS

PNL . . . liquid crystal display panel
OS . . . optical sheet
BL . . . backlight
AR . . . liquid crystal display region
SCD . . . semiconductor device (tape carrier type)
FB . . . flexible board
CH . . . semiconductor chip
PCB1, PCB2 . . . printed circuit boards
DFR . . . lower frame
RS . . . reflective sheet
EFL . . . external electrode fluorescent tube
BWh . . . side wall plate
UFR . . . upper frame
MFR . . . middle frame
PWC . . . power supply controlling circuit substrate
WGB . . . wire guide plate
WR1, WR2, WR3 . . . wires
CC . . . notch
TH2, TH3 . . . through holes
TMT . . . electrode support
TMS . . . electrode supporting member
TMF . . . electrode metal fixture
SC . . . screw
WF . . . temporary wire securing portion
CF . . . temporary connector securing portion
FC . . . engaging portion
PJ . . . protrusion
DNT . . . recess
DN . . . dummy connector

DETAILED DESCRIPTION OF THE INVENTION

In the following, the liquid crystal display device according to an embodiment of the present invention is described in reference to the drawings.

<Configuration of Entirety>

Figure 2:
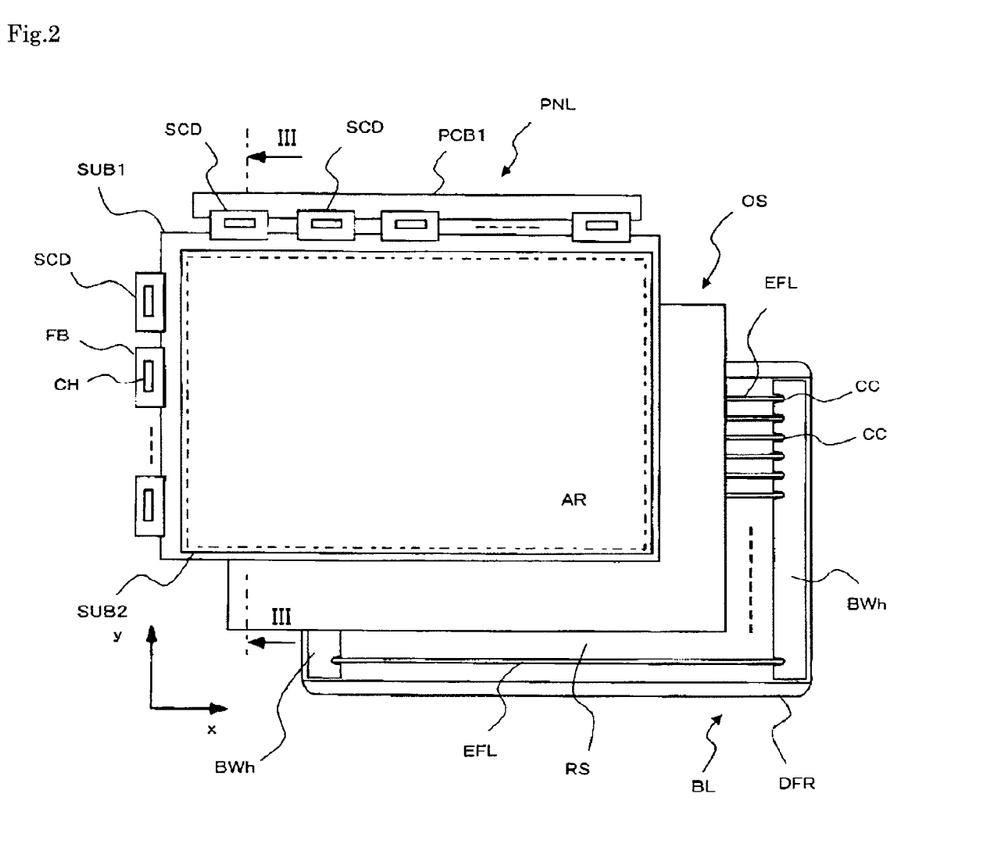
FIG. 2 is a cross sectional diagram showing a modular liquid crystal display device according to one embodiment of the present invention.

FIG. 2 is a schematic diagram showing the configuration of the liquid crystal display device according to one embodiment of the present invention.

A liquid crystal display panel PNL, an optical sheet OS and a backlight BL are provided in this order from the viewer side.

The liquid crystal display panel PNL is formed of a pair of substrates SUB1 and SUB2 made of glass, for example, which are provided in parallel as outer walls, and liquid crystal which intervenes between these substrates SUB1 and SUB2.

Pixels (not shown) aligned in a matrix are formed on the surface of the above described substrates SUB1 and SUB2 on the liquid crystal side with the above described liquid crystal as one component, so that each of the pixels can control the transmissivity of the liquid crystal to light.

In addition, the region where these pixels are formed is used as a liquid crystal display region AR (region surrounded by single-dot chain line in figure), and the entirety of the liquid crystal display region AR is irradiated with light from the below described backlight BL, so that the viewer can recognize an image through light that passes through the respective pixels.

The substrate SUB1 provided in the rear relative to the viewer side has portions which are exposed from the substrate SUB2 on the left side and on the upper side in the figure, and one side of a number of semiconductor devices SCD can be connected in these portions. These semiconductor devices SCD are so-called tape carrier type semiconductor devices and formed of semiconductor chips CH mounted on the upper surface of flexible boards FB where wires are formed.

The semiconductor devices SCD are formed of circuits for individually driving each of the above describe pixels. In the semiconductor devices SCD (video signal driving circuit) which are aligned in the x direction in the figure from among the above described semiconductor devices SCD, a printed circuit board PCB1 is connected on the side facing the side that is connected to the above described substrate SUB1, so that external input signals can be inputted via the printed circuit board PCB1.

In addition, in the semiconductor devices SCD (scanning signal driving circuit) which are aligned in the y direction in the figure from among the above described semiconductor devices SCD, an external input signal is inputted via a wire (not shown) formed on the surface of the substrate SUB1, and therefore, no printed circuit board corresponding to the above described printed circuit board PCB1 is connected in the configuration.

In addition, a backlight BL is provided on the rear surface of the liquid crystal display panel PNL via a diffusion sheet, a prism sheet or a multilayer optical sheet OS of these, for example. The optical sheet OS diffuses light from the backlight BL or collects light, so that light is guided toward the liquid crystal display panel PNL side.

The backlight BL is a so-called directly-behind-the-display type and has a number of external electrode fluorescent tubes EFL which are aligned in the y direction in the figure and of which the longitudinal direction coincides with the x direction in the figure within a plane which is parallel to the liquid crystal display panel PNL, and these external electrode fluorescent tubes EFL are respectively supported by a lower frame DFR in box form which is formed of, for example, a metal.

A reflective sheet RS is mounted on the surface of the lower frame DFR, and side wall surfaces BW gained by raising the periphery by bending the reflective sheet RS is formed in the upper and lower sides in the figure.

Here, side wall plates BWh made of a resin material having an inclination with the outside higher are provided on the left and right side of the lower frame DFR in the figure so as to cover the electrodes at the two ends of the above described external electrode fluorescent tubes EFL. Here, notches CC for preventing interference with the external electrode fluorescent tubes EFL are created on the lower side of the side wall plates BWh.

These side wall plates BWh have a light reflecting function on the surface on the above described liquid crystal display panel PNL side and form a substantial side wall portion of the back light BL together with the side wall surfaces BW of the above described reflective sheet RS. The configuration of the back light BL is described in further detail below.

<Configuration of Modules>

Figure 3:
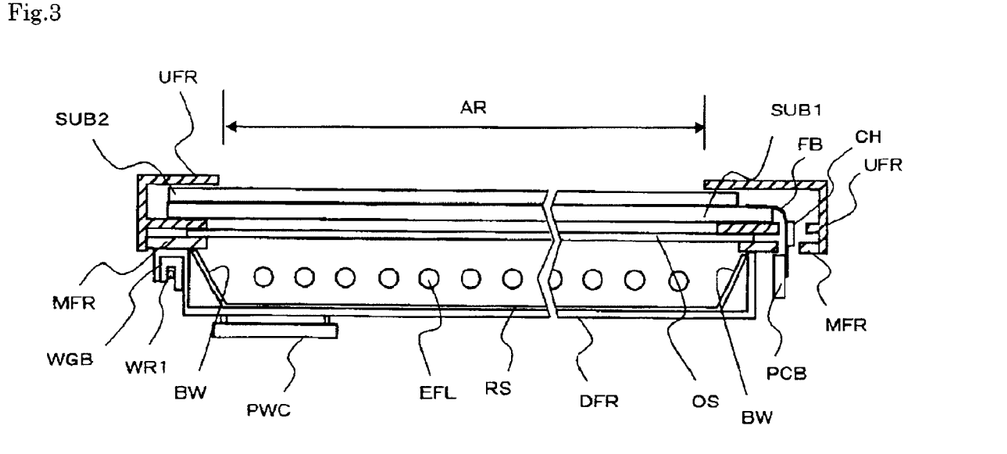
FIG. 3(a) is a diagram showing a state where a side wall plate BWh is provided.
FIG. 3(b) is a diagram showing a state where the side wall plate BWh is removed.

In addition, the liquid crystal display panel PNL, the optical sheet OS and the back light BL are formed of an upper frame UFR and a middle frame MFR which are respectively secured to the above described lower frame DFR, as shown in FIG. 3, so as to form a module liquid crystal display device which is combined with the liquid crystal display panel PNL. Here, FIG. 3 is a cross sectional diagram along line III-III in FIG. 2.

At least one opening OP for exposing the liquid crystal display region AR of the liquid crystal display panel PNL is created in the upper frame UFR on the viewer side.

Here, the semiconductor device SCD connected to the substrate SUB1 of the liquid crystal display panel PNL is provided in such a state that the side connected to the printed circuit board PCB1 is bent at a right angle in the portion of the flexible board FB. This is so that the frame becomes narrower in the liquid crystal display device.

Figure 4:
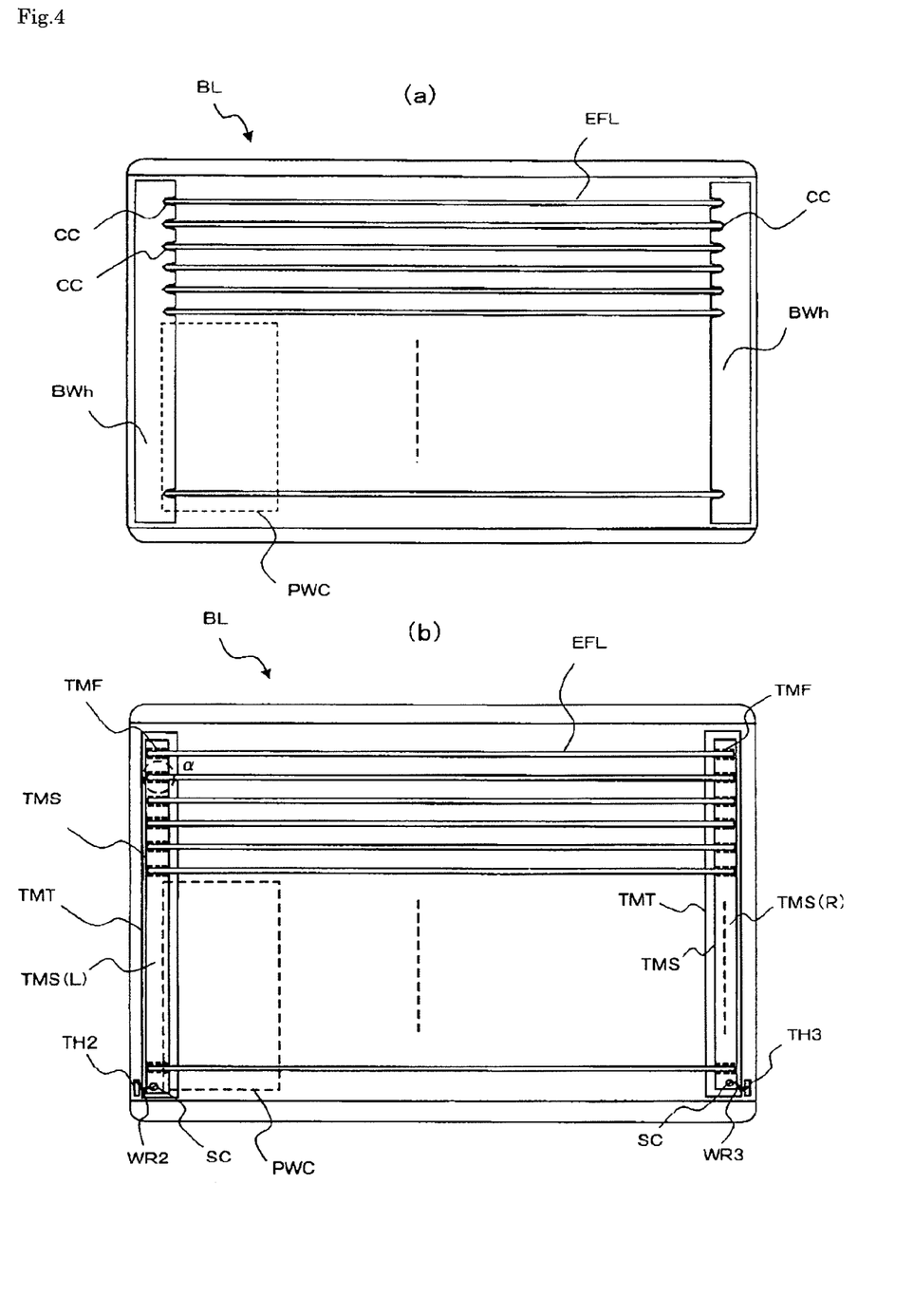
FIG. 4 is a diagram showing the configuration of an electrode supporting member which is attached to the above described back light and electrode metal fixtures provided with this electrode supporting member.

In addition, as shown in FIG. 3, a power controlling circuit substrate PWC provided with an inverter for supplying power to the above described external electrode fluorescent tube EFL and turning on and controlling light is mounted on the rear surface of the lower frame DFR. This power supply controlling circuit substrate PWC is mounted on the rear surface on the lower left side of the lower frame DFR, for example (shown by dotted line in FIG. 4) when the lower frame BFR is viewed from the liquid crystal display panel PNL side.

Furthermore, a wire guide plate WGB formed of, for example, a resin, is attached to the lower side on the rear surface of the lower frame DFR from among a pair of sides in the x direction of the above described lower frame. The electrodes at the two ends of the above described external electrode fluorescent tubes EFL are electrically connected to the above described power supply controlling circuit substrate PWC and the electrical connection between the electrodes of the above described external electrode fluorescent tubes EFL and the power supply controlling circuit substrate PCW which is located far away from the above described power supply controlling circuit substrate PWC can be achieved through the wire WR1 which is guided by the above described wire guide plate WGB. The wire guide plate WGB and the above described wire WR1 are described in further detail below.

<Backlight>

FIG. 4(a) is a diagram showing only the backlight BL shown in FIG. 2, and FIG. 4(b) is a diagram showing a state where the above described side wall plate BWh is removed from the backlight BL shown in FIG. 4(a).

The respective side wall plates BWh are provided so as to overlap with the electrode supports TMT made of, for example, a resin material, which are secured to the lower frame BFR, and the electrode supporting members TMS provided on the surface o the electrode supports TFT are exposed when the side wall plates BWF are removed from the electrode supports TMT.

The electrode supporting members TMS are formed of a number of electrode metal fixtures TMF for supporting and electrically connecting the electrodes of the external electrode fluorescent tubes EFL. The electrode supporting members TMS are formed through press processing together with the electrode metal fixtures TMF.

The electrode supporting members TMS are provided along the two short sides within the lower frame BFR, and the two electrode supporting members TMS have the same structure.

The electrode supporting members TMS are secured to the above described electrode supports TMT using screws SC at one end in the longitudinal direction, for example. The electrode metal fixtures TMF are secured to the support TMT only at one end in the longitudinal direction, so that the electrode metal fixtures TMF are prevented from lifting off from the electrode supporting members TMS and bending due to thermal expansion.

Incidentally, when the side wall plates BWh are secured to the electrode supporting members TMS (by means of screws, for example), the electrode supporting members TMS are slightly pressed against the electrode supports TMT by a number of protrusions (not shown) formed on the surface of the side wall plates BWh on the side facing the electrode supporting members TMS at certain intervals in the longitudinal direction of the electrode supporting members TMS.

<Electrode Supporting Members>

Figure 5:
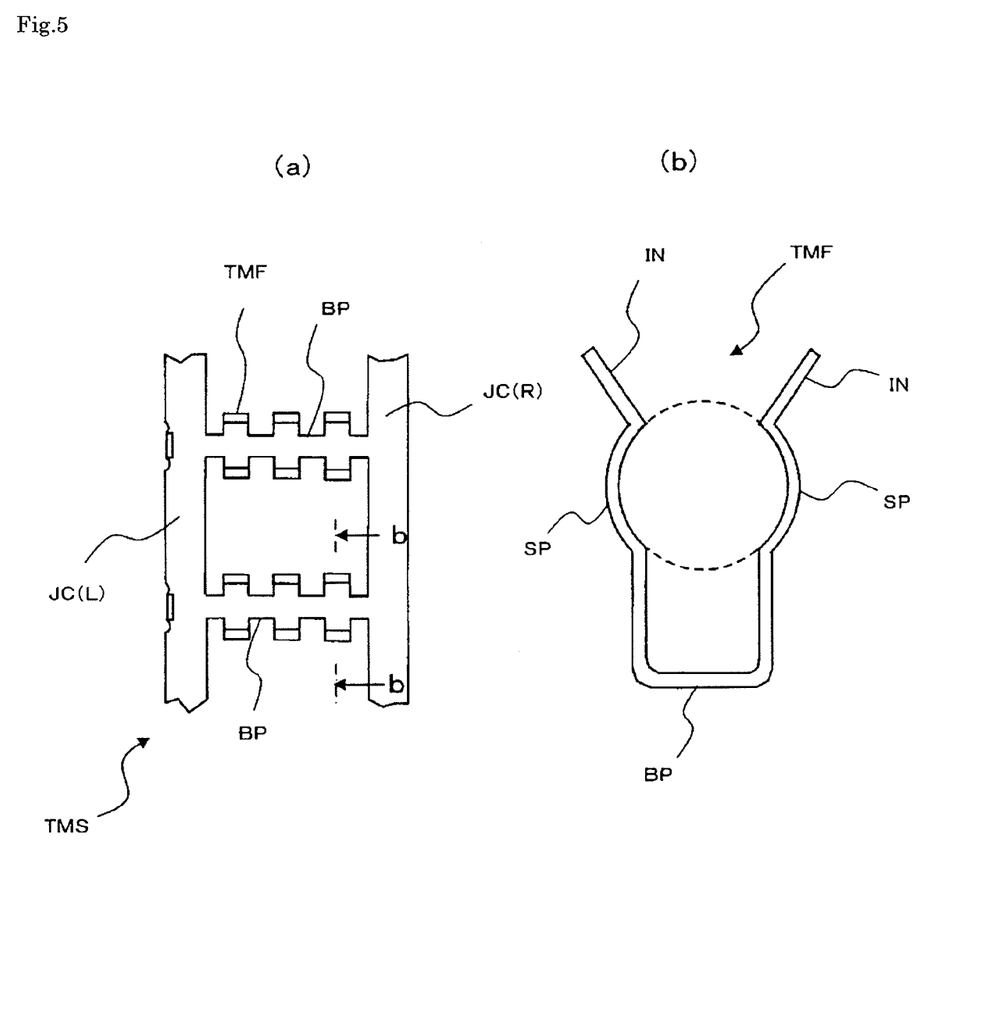
FIG. 5 is a plan diagram showing the lower frame of the above described back light as viewed from the rear.

FIG. 5(a) is a diagram showing one of the electrode supporting members TMS shown in FIG. 4(b) in detail, and an enlarged diagram showing the portion surrounded by the dotted line a in FIG. 4(b). In addition, FIG. 5(b) is a cross sectional diagram along line b-b in FIG. 5(a).

As shown in FIG. 5(a), the electrode supporting members TMS have bases BP for securing electrode metal fixtures TMF and left side connection portions JC(L) and right side connection portions JC(R) which are connected to the bases BP on the two sides, and the bases BP, as well as the respective connection portions JC(L) and JC(R), are formed in a ladder pattern as viewed in a plane.

Three electrode metal fixtures TMF are formed side by side along each base BP, for example. Each of these three electrode metal fixtures TMF is formed so as to be electrically connected to one electrode of an external electrode fluorescent tube EFL, so that the connection becomes more reliable.

As shown in FIG. 5(b), the electrode metal fixtures TMF are formed so as to have a forked structure with a pair of prongs which face each other and sandwich an electrode of an external electrode fluorescent tube EFL from both sides. That is to say, a pair of supports SP gained by bending the two sides of a base BP at a right angle, for example, is provided with arc portions for pressing an electrode of an external electrode fluorescent tube EFL from two sides along the circumference of the electrode which face each other. In addition, electrode metal fixtures TMF are provided with guiding portions IT which make it easy to guide electrodes of external electrode fluorescent tubes EFL to the point between the electrode metal fixtures TMF. Here, the dotted circle in FIG. 5(b) is the outer periphery of an electrode of an external electrode fluorescent tube EFL.

As shown in FIG. 4(b), the thus formed electrode supporting members TMS have a wire WR2 leading out from the portion secured to the electrode support TMT by means of a screw SC on the right side of the electrode supporting member TMS (shown as TMS(L) in figure), and this wire WR2 passes through a through hole (or notch) TH2 created in the lower frame DFR so as to lead out to the rear surface of the lower frame DFR. In addition, a wire WR3 leads out from the portion secured to the electrode support TMT by means of a screw SC on the right side of the electrode supporting member TMS (shown as TMS(R) in figure), and this wire WR3 passes through a through hole (or notch) TH3 created in the lower frame DFR so as to lead out to the rear surface of the lower frame DFR.

A power supply controlling circuit substrate PWC is mounted on the rear surface of the lower frame DFR, as described above, and power is supplied to the electrode supporting members TMS(L) and TMS(R) through the wires WR2 and WR3 via this power supply controlling circuit substrate PWC.

<Power Supply Controlling Circuit Substrate and Wire Guide Plate>

Figure 6:
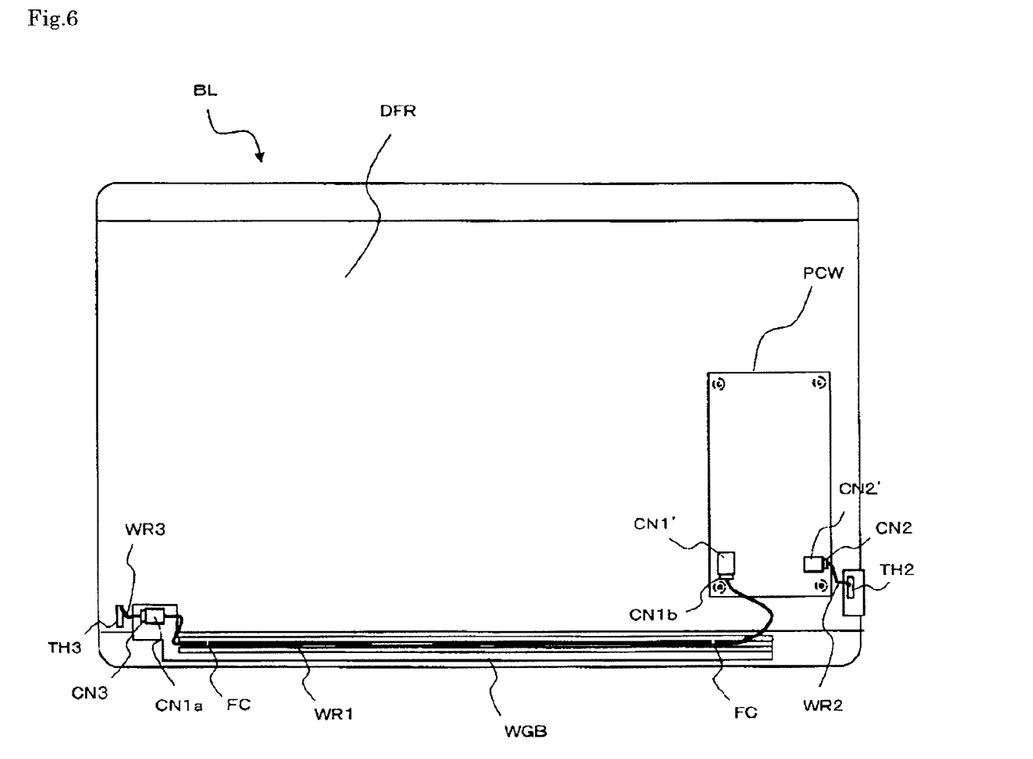
FIG. 6 is a diagram showing the configuration of a wire guide plate provided with the liquid crystal display device according to one embodiment of the present invention.

FIG. 6 is a plan diagram showing the lower frame DFR as viewed from the rear side, and shows the lower frame DFR shown in FIGS. 4(a) and 4(b) in a turned-over state with the left and right reversed.

In FIG. 6, the wire WR2 connected to the electrode supporting member TMS(L) passes through the through hole TH2 so as to lead out to the rear surface of the lower frame DFR, and is connected to a connector CN2 which can be electrically coupled with a connector CN2' mounted on the power supply controlling circuit substrate PWC at the end of the wire that runs out from the rear surface.

In this case, the portion of the wire WR2 which leads out to the rear side of the lower frame DFR is in the vicinity of the power supply controlling circuit substrate PWC, and therefore, the wire WR2 is short.

In contrast, the portion of the wire WR3 connected to the electrode supporting member TMS(R) which passes through the through hole TH3 and leads out to the rear surface of the lower frame DFR is in a location far away from the power supply controlling circuit substrate PWC. Therefore, the wire WR3 makes electrical connection with the power supply controlling circuit substrate PWC possible through the wire WR1 guided to the wire guide plate WGB. That is to say, the wire WR3 is short.

The above described wire guide plate WGB is attached along the bottom side of the lower frame DFR in the figure. One end of the wire guide plate WGB is in the vicinity of the above described through hole TH3, and the other end is located close to the above described power supply controlling circuit substrate PWC.

The above described wire guide plate WGB is provided with a wire WR1 which is guided in the longitudinal direction of the wire guide plate WGB, and the above described connector CN1a which is electrically coupled with a connector CN3 and the above described connector CN1b which is electrically coupled with a connector CN1' are connected to the two ends of the wire WR1.

The portion of the wire WR1 which extends over the power supply controlling circuit substrate TWC side and over the location where the guidance by the above described wire guide plate WGB ends (location where the wire becomes free from the wire guide plate WGB) is sufficiently long.

Here, as shown in FIG. 6, engaging portions FC are formed in the vicinity of the two ends of the wire guide plate WGB, so that these engaging portions FC can prevent the wire WR1 from becoming free from the wire guide plate WGB.

In addition, though electrical parts other than the connectors CN1' and CN2' are mounted on the power supply controlling circuit substrate PWC, FIG. 6 does not show these.

<Details of Wire Guide Plate>

FIG. 1(a) is a plan diagram showing the portion of the wire guide plate WGB on the side close to the power supply controlling circuit substrate PWC. Here, FIGS. 1(b), 1(c) and 1(d) are cross sectional diagrams along lines b-b, c-c and d-d in FIG. 1(a).

Figure 1:
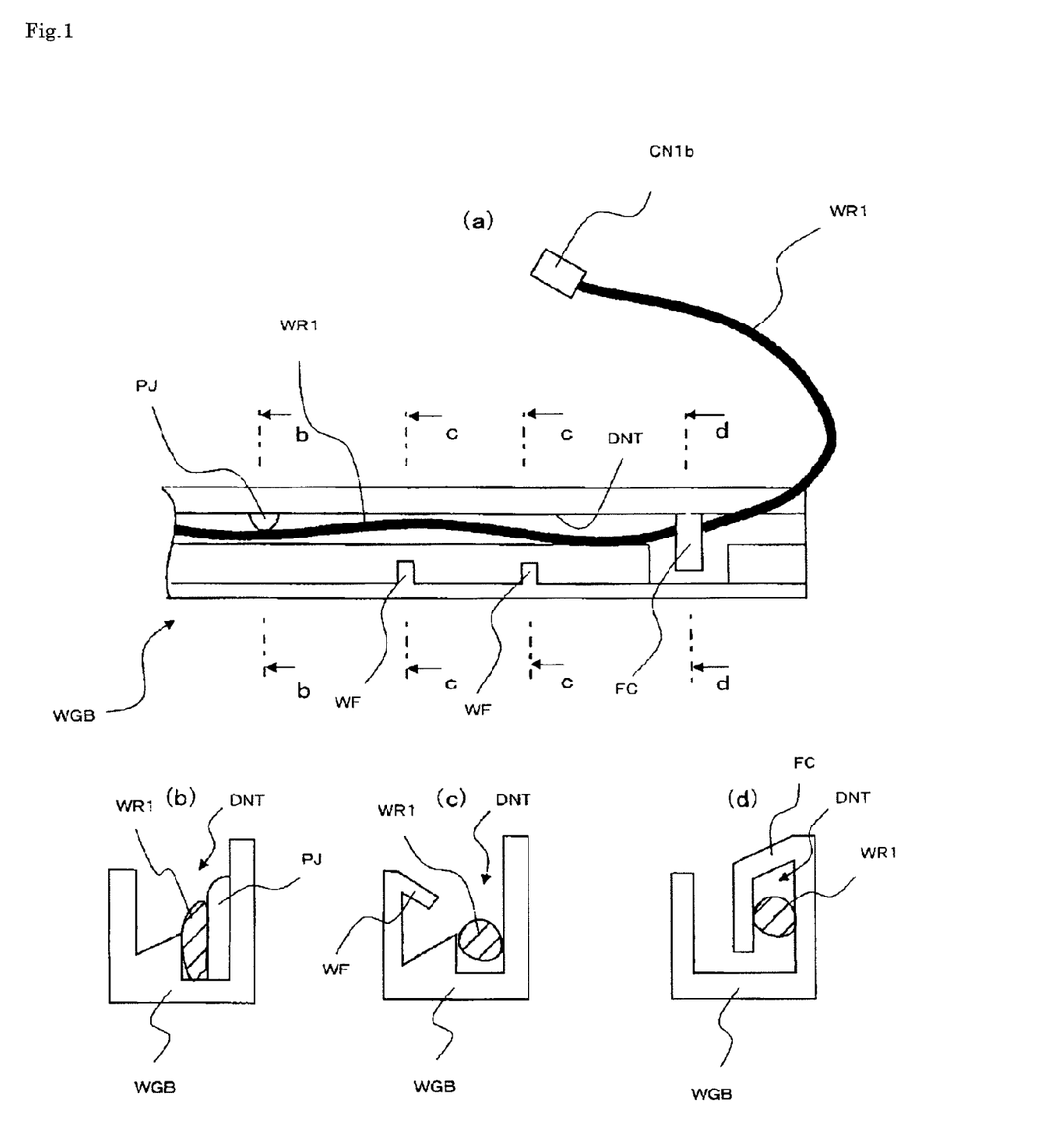
FIG. 1 is a schematic diagram showing the configuration of the liquid crystal display device according to one embodiment of the present invention.

A recess DNT for containing the wire WR1 is created in the longitudinal direction in the wire guide plate WGB, and a number of protrusions PJ are provided at certain intervals on the wall surface of the recess DNT (only one shown in figure), and in these portions a small gap is formed. This is in order to make it difficult for the wire WR1 to come out from the recess DNT.

In addition, as shown in FIG. 1(d), the engaging portions FC are formed of members supported on one side, of which one end is secured to the wire guide plate WGB, and which covers the recess DNT. The wire WR1 provided in the recess DNT is prevented from moving (coming off from the wire guide plate WGB) by the engaging portions FC when the wire is pulled up relative to the wire guide plate WGB.

Furthermore, temporary wire securing portions WF are formed on the wall surface on the side opposite to the side where the engaging portions FC are formed. For example, two temporary wire securing portions WF are provided in the vicinity of the engaging portions FC on the connector CN1b side in the longitudinal direction of the wire guide plate WGB. The respective temporary wire securing portions WF are formed of members supported on one side, of which one end is secured to the wire guide plate WGB and which is formed so as to cover the upper surface of the wire guide plate WGB.

FIG. 1 is a diagram showing the connector CN1b of the wire WR1 in the state before being electrically coupled with the connector CN1' of the power source controlling circuit substrate PWC.

The portion of the wire WR1 between the connecting portions FC of the wire guide plate WGB and the connector CN1b is relatively long. Therefore, when the lower frame BFR is carried at a stage where the power supply controlling circuit substrate PWC is not attached to the lower frame DFR, the portion of the wire WR1 between the engaging portions FC and the above described connector CN1b fluctuates with the engaging portions FC at the center. In this state, the wire WR1 is very troublesome at the time of transportation and assembly. In addition, there is a risk that the wire WR1 may be disconnected during the operation by human mistake. Furthermore, there is also a possibility that the connector CN1b may be damaged as a result of frequent and repeated interference with the lower frame DFR.

Therefore, in the present embodiment, a temporary wire securing portion WF is provided, so that the portion of the wire WR1 between the engaging portions FC of the wire guide plate WGB and the connector CN1b can be temporarily secured to the temporary wire securing portion at the time of transportation.

Figure 7:
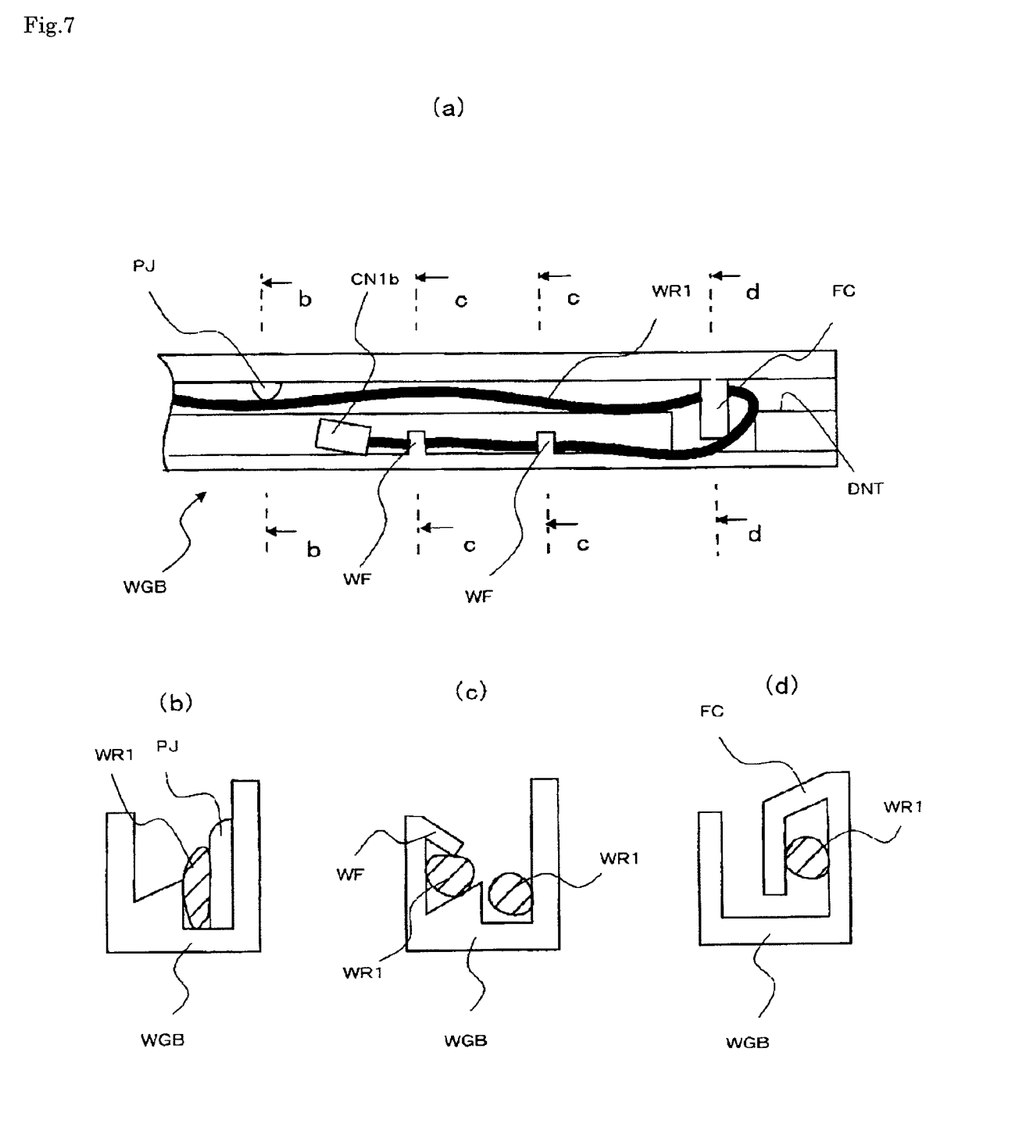
FIG. 7 is a diagram illustrating the manner in which the wire guide plate shown in FIG. 6 is used.

FIG. 7 is a diagram corresponding to FIG. 1, and shows a case where the portion of the wire WR1 between the engaging portions FC of the wire guide plate WGB and the above described connector CN1b is bent in a portion of the engaging portions FC, so that the wire WR1 in the vicinity of the connector CN1b is temporarily secured by the temporary wire securing portion WF.

As a result, the portion of the wire WR1 between the engaging portions FC of the wire guide plate WGB and the above described connector CN1b does not fluctuate when the lower frame DFR is carried, and it becomes possible to prevent the state from becoming such that the connector CN1b interferes with the lower frame DFR.

Other Embodiments

Figure 8:
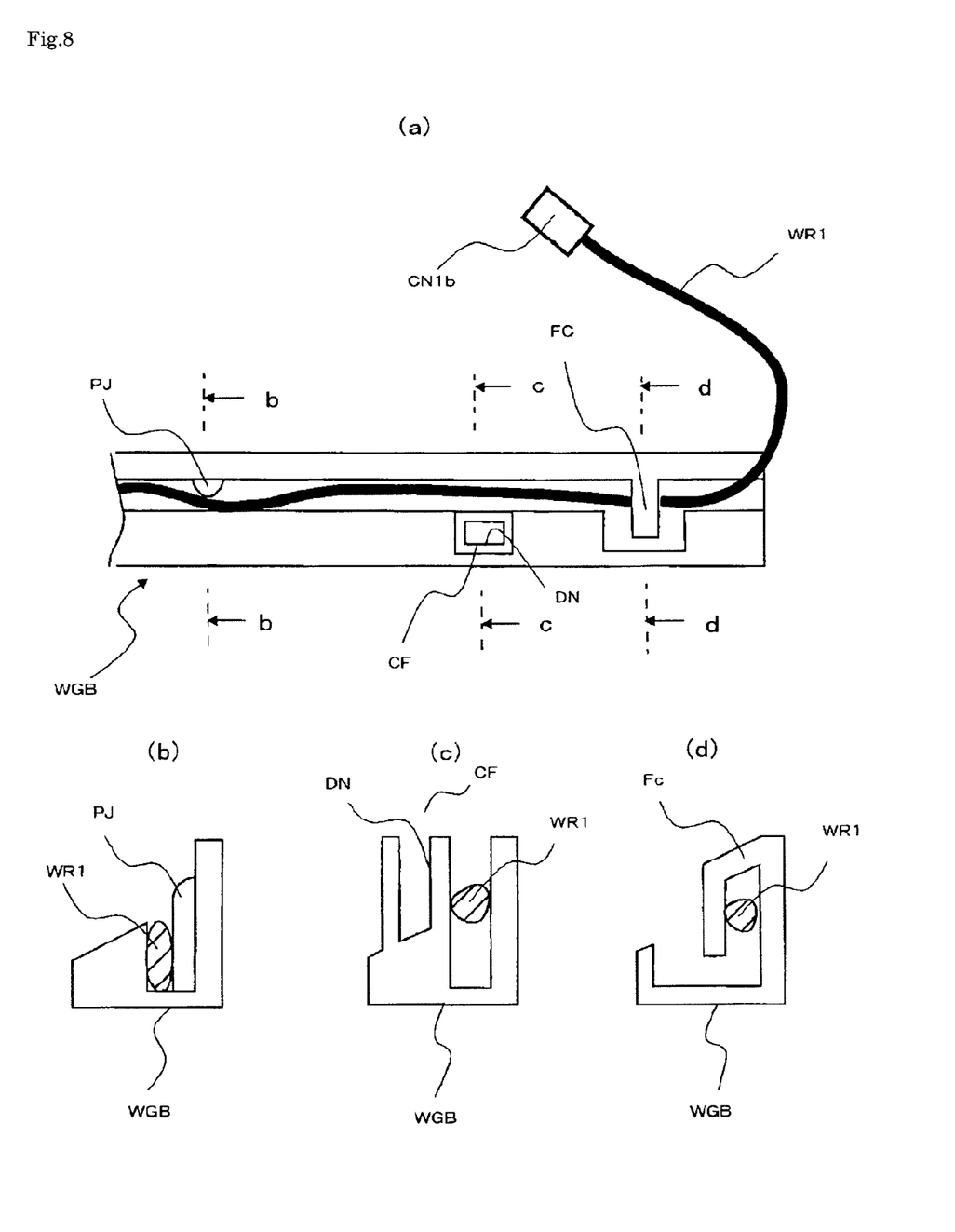
FIG. 8 is a diagram showing the configuration of a wire guide plate provided with the liquid crystal display device according to one embodiment of the present invention.

FIG. 8 is a diagram showing the configuration of a main portion of the liquid crystal display device according to another embodiment of the present invention, and corresponds to FIG. 1.

In the above described embodiment, temporary engaging portions WF are provided to the wire guide plate GB in order to prevent the portion of the wire WR1 between the engaging portions FC and the connector CN1b from fluctuating. Alternatively, only the connector CN1b may be temporarily secured to the wire guide plate WGB. An example of this is shown in FIG. 8.

In FIG. 8, a temporary connector securing portion CF having a dummy connector DN into which the connector CN1b can be inserted is provided in the vicinity of the engaging portions FC on the wire guide plate WGB. Though this temporary connector securing portion CF is formed on the left of the engaging portion CF in the figure, it may be formed on the right.

Figure 9:
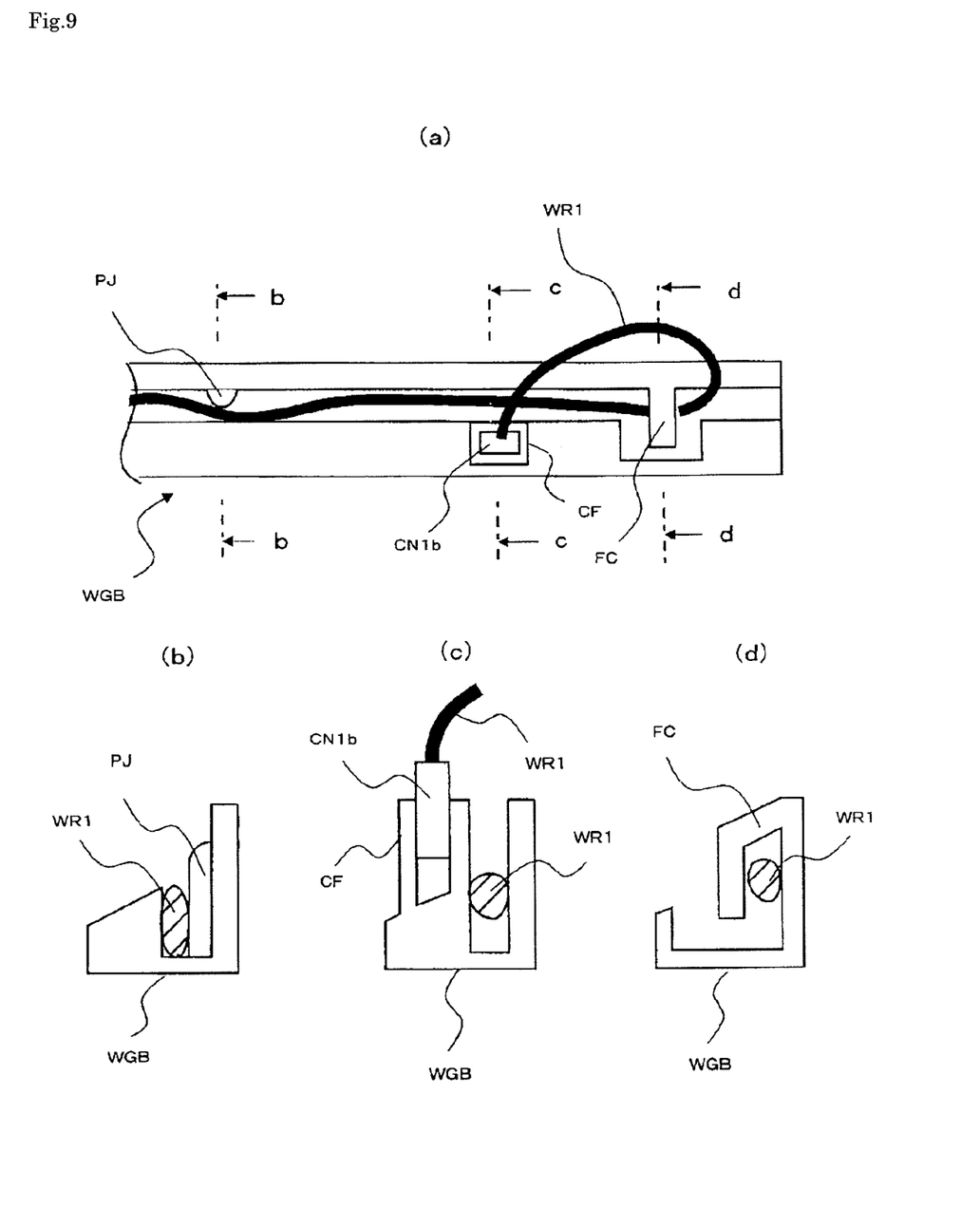
FIG. 9 is a diagram illustrating the manner in which the wire guide plate shown in FIG. 6 is used.

FIG. 9 is a diagram corresponding to FIG. 8, and shows a case where the connector CN1b is inserted into the temporary connector securing portion CF so that the connector CN1b is temporarily secured.

As a result, it becomes possible to prevent a state where the connector CN1b interferes with the lower frame DFR when the lower frame DFR is carried.

The above described embodiments may be used alone or combined for use. This is because the effects of each embodiment can be gained both when used alone and in combination.

The invention claimed is:

1. A liquid crystal display device, comprising a liquid crystal display panel, a backlight provided on one surface side of said liquid crystal display panel and a power supply controlling circuit substrate for turning on and controlling said backlight which is mounted on the surface of said backlight on the side opposite to the surface which faces said liquid crystal display panel, characterized in that
   said backlight has a rectangular shaped frame member with long and short sides, a number of light sources in rod form aligned in parallel within said frame member with respect to an inside surface of said frame member, a first electrode supporting member electrically connected to one end of said number of light sources in rod form, and a second electrode supporting member electrically connected to the other end of said number of light sources in rod form,
   a wire guide member is arranged along one long side of said frame member, said wire guide member holding a wire for electrically connecting at least one of said first electrode supporting member and second electrode supporting member to said power supply controlling circuit substrate, and
   said wire guide member has a wire securing portion where said wire is secured and a temporary wire securing portion which at least temporarily secures said wire running between said wire securing portion and said power supply controlling circuit substrate.

2. The liquid crystal display device according to claim 1, characterized in that
   the two ends of said wire are provided with a first connector and a second connector,
   said first electrode supporting member is provided with a third connector,
   said second electrode supporting member is provided with a fourth connector,
   said power supply controlling circuit substrate is provided with a fifth connector and a sixth connector,
   said first connector is coupled with said fifth connector in the case where said power supply controlling circuit substrate is connected to said backlight, and
   the end portion of said wire on said first connector side is secured to said temporary wire securing portion in the case where said power supply controlling circuit substrate is not connected to said backlight.

3. The liquid crystal display device according to claim 1, characterized in that said wire securing portion is formed close to a wall surface on one side within said wire guide member and said temporary wire securing portion is formed on the wall surface of said wire guide member on the side opposite to the wall surface on the side where said wire securing portion is formed.

4. The liquid crystal display device according to claim 3, characterized in that a number of temporary wire securing portions which are the same as said temporary wire securing portion are provided in the longitudinal direction of said wire guide member.

5. A liquid crystal display device, comprising a liquid crystal display panel, a backlight provided on one surface side of said liquid crystal display panel and a power supply controlling circuit substrate for turning on and controlling said backlight which is mounted on the surface of said backlight on the side opposite to the surface which faces said liquid crystal display panel, characterized in that said backlight has a rectangular shaped frame member with long and short sides, a number of light sources in rod form aligned in parallel within said frame member with respect to an inside surface of the frame member, a first electrode supporting member electrically connected to one end of said number of light sources in rod form, and a second electrode supporting member electrically connected to the other end of said number of light sources in rod form, a wire guide member is arranged along one long side of said frame member, said wire guide member holding a wire for electrically connecting at least one of said first electrode supporting member and second electrode supporting member to said power supply controlling circuit substrate, a first connector is formed in the end portion of said wire which is connected to said power supply controlling circuit substrate, and said wire guide member having a wire securing portion where said wire is secured and a temporary connector securing portion into which said first connector is insertable.

6. The liquid crystal display device according to claim 5, characterized in that the two ends of said wire are provided with a first connector and a second connector, said first electrode supporting member is provided with a third connector, said second electrode supporting member is provided with a fourth connector, said power supply controlling circuit substrate is provided with a fifth connector and a sixth connector, said first connector is coupled with said fifth connector in the case where said power supply controlling circuit substrate is connected to said backlight, and said first connector is connected to said temporary connector securing portion in the case where said power supply controlling circuit substrate is not connected to said backlight.

7. The liquid crystal display device according to claim 5, characterized in that said wire securing portion is formed close to a wall surface on one side within said wire guide member and said temporary connector securing portion is formed on the wall surface of said wire guide member on the side opposite to the wall surface on the side where said wire securing portion is formed.

8. The liquid crystal display device according to claim 1, characterized in that said wire guide member is attached along the one long side of said frame member which coincides with the longitudinal direction of said light source in rod form.

9. The liquid crystal display device according to claim 5, characterized in that said wire guide member is attached along the one long side of said frame member which coincides with the longitudinal direction of said light source in rod form.

10. The liquid crystal display device according to claim 1, characterized in that a number of protrusions for restricting the movement of said wire are provided on a wall surface of said wire securing portion.

11. The liquid crystal display device according to claim 5, characterized in that a number of protrusions for restricting the movement of said wire are provided on a wall surface of said wire securing portion.

12. The liquid crystal display device according to claim 1, characterized in that said wire guide member is attached along an outside surface of said frame member along the one long side of frame member.

13. The liquid crystal display device according to claim 12, wherein said wire guide member includes a U-shaped channel.

14. The liquid crystal display device according to claim 5, characterized in that said wire guide member is attached along an outside surface of said frame member along the one long side of frame member.

15. The liquid crystal display device according to claim 14, wherein said wire guide member includes a U-shaped channel.

* * * * *